United States Patent [19]
Hidaka et al.

[11] Patent Number: 4,741,163

[45] Date of Patent: May 3, 1988

[54] METHOD AND APPARATUS FOR CONTROLLING SUPERCHARGE PRESSURE FOR A TURBOCHARGER

[75] Inventors: Terufumi Hidaka, Fujisawa; Yoshio Iwasa, Nagareyama, both of Japan

[73] Assignee: Nissan Motor Co., Ltd., Kanagawa, Japan

[21] Appl. No.: 812,407

[22] Filed: Dec. 23, 1985

[30] Foreign Application Priority Data

Jan. 16, 1985 [JP] Japan .................................. 60-5475

[51] Int. Cl.⁴ ............................................. F02D 23/00
[52] U.S. Cl. ....................................... 60/602; 60/603
[58] Field of Search ................... 60/600, 601, 602, 603

[56] References Cited

U.S. PATENT DOCUMENTS

| | | | |
|---|---|---|---|
| 4,160,170 | 7/1979 | Harner et al. | 290/44 |
| 4,297,076 | 10/1981 | Donham et al. | 416/37 |
| 4,617,799 | 10/1986 | Todokoro et al. | 60/602 |

FOREIGN PATENT DOCUMENTS

| | | |
|---|---|---|
| 0115859 | 8/1984 | European Pat. Off. . |
| 0136541 | 4/1985 | European Pat. Off. . |
| 2155996 | 10/1985 | United Kingdom . |

*Primary Examiner*—Stephen F. Husar
*Attorney, Agent, or Firm*—Foley & Lardner, Schwartz, Jeffery, Schwaab, Mack, Blumenthal & Evans

[57] ABSTRACT

A method and an apparatus for controlling supercharge pressure for a turbocharger in which a target value of supercharge pressure is set up in accordance with the operating conditions of the engine and a basic control amount for a control valve for controlling the exhaust gas flow to an exhaust gas turbine is also set up in accordance with the operating conditions of the engine, and the basic control amount is corrected in response to the deviation between actual supercharge pressure and a target supercharge pressure value, when performing a feedback control of the supercharge pressure. With this construction, the actual supercharge pressure can accurately and stably be controlled to the target value required in accordance with the operating conditions of the engine.

12 Claims, 5 Drawing Sheets

METHOD AND APPARATUS FOR CONTROLLING SUPERCHARGE PRESSURE FOR A TURBOCHARGER

BACKGROUND OF THE INVENTION (1) Field of the Invention

The present invention relates to a method and an apparatus for controlling supercharge pressure for vehicles having a turbocharger and an internal combustion engine supercharged by the turbocharger.

(2) Description of the Prior Art

It has been widely practiced heretofore that intake air is supercharged by a turbocharger in order to improve the output power of the internal combustion engine.

The turbocharger comprises an exhaust gas turbine driven by the exhaust energy of the engine, and an intake air compressor capable of being rotated by the exhaust gas turbine for supercharging the intake air. The exhaust gas turbine is rotated at high speed when the exhaust gas flow rate of the engine increases and it can drive the compressor efficiently. However, in a low load operation zone of the engine having a small exhaust gas flow rate, it is inevitable that the supercharge efficiency of the exhaust gas turbine lowers.

For the purpose of preventing the number of rotations of the exhaust gas turbine from lowering and efficiently supercharging the turbine up to a relatively small engine load zone, a supercharge pressure apparatus has been already proposed in which a control valve is provided at the inlet of the exhaust gas turbine for controlling the exhaust gas flow speed and the opening of the control valve is controlled in accordance with the operating conditions of the engine, thereby reducing the opening of the control valve in a low load operation zone having less exhaust gas flow, so as to increase the exhaust gas flow and meet the purpose (see, for instance, U.S. Pat. No. 2 944 786).

In this kind of the supercharge pressure control apparatus according to the prior art, however, it was difficult to control a control valve accurately in accordance with the operating conditions of the engine. Namely, when the control valve is excessively closed, the supercharge pressure is increased more than a target supercharge pressure, while if the control valve is excessively opened, the supercharge pressure is lowered.

In addition, if the correction or compensation for deviation is delayed in the direction of decrease in the supercharge pressure when the supercharge pressure is increased, damages due to a knocking condition of the engine and an excessive load condition wear tends to be invited. Furthermore, when the valve control is suddenly performed, an overshoot condition in the supercharge pressure occurs and a stable control for the supercharge pressure control tends to be difficult. Moreover, in the supercharge control according to the prior art, the target value of supercharge pressure to be controlled was always maintained constant regardless of the operating conditions of the engine. As a result, it was difficult to realize an optimum supercharged condition required for the engine. It also resulted in the problem that a sufficient improvement in the output characteristics and fuel consumption rate could not necessarily be achieved.

SUMMARY OF THE INVENTION

It is therefore an object of the present invention to provide a method and an apparatus for controlling supercharge pressure in which a basic control amount for performing a feedback control is corrected in accordance with the operating conditions of the engine and the deviation between actual supercharge pressure and a target value of supercharge pressure.

It is another object of the present invention to provide a method and an apparatus for controlling supercharge pressure for a turbocharger in which the actual supercharge pressure can not be changed much even if the operating conditions of the engine change slightly and the stability of the feedback control of the supercharge pressure can be increased.

It is still another object of the present invention to provide a method and an apparatus for controlling supercharge pressure for a turbocharger in which when the operating conditions of the engine are fluctuated, the basic control amount is also varied by adding a correction amount for the fluctuations to the basic control amount, so that the opening of a control valve in question can suitably be controlled.

According to the present invention, the basic control amount is corrected in accordance with the deviation between actual supercharge pressure and a target value and the opening of a control valve is controlled so as to reduce the opening when the actual supercharge pressure is lower than the target value, to increase the opening thereof when the actual pressure is higher than the target value, and to maintain the opening thereof to a predetermined value when the actual pressure is equal to the target value, so as to rapidly achieve agreement of the actual supercharge pressure with the target value of supercharge pressure.

One feature of the present invention resides in the method of controlling supercharge pressure for a turbocharger, which comprises the steps of: detecting actual engine speed, intake air flow rate, supercharge pressure, and vehicle speed, etc; reading a basic control amount from a look-up table in accordance with the operating conditions of the engine thus detected; comparing the actual supercharge pressure thus detected, with a predetermined first target value; comparing the actual supercharge pressure with a predetermined second target value in accordance with the result of the first comparison; maintaining the same control condition as that performed at the previous time by adding a previous control amount to the basic control amount if the result of the first and second comparisons is within the first and second predetermined target values; determining if the actual engine speed is continuing equal to or more than a predetermined time, in accordance with the first or second comparison; and calculating a feedback correction amount at this time by adding or subtracting a predetermined value to or from the previous control amount and controlling the opening of a control valve in accordance with the result of the first comparison or the second comparison either in the direction of opening or in the direction of closure of the control valve.

Another feature of the present invention resides in the apparatus for controlling supercharge pressure for a turbocharger, which comprises; a plurality of detecting means for detecting operating conditions of the engine such as intake air flow rate, supercharge pressure, engine speed, etc; a control flap valve provided at a guide path of exhaust path and having a shaft member for controlling the exhaust gas flow into an exhaust gas turbine; an actuator coupled to said shaft member of said control flap valve through arm and rod means; an electromagnetic valve provided between an liaison path and said actuator for controlling said actuator in accordance with a control signal; and an electronic control unit having a microprocessor including a CPU, a RAM, and a ROM for producing said control signal and for controlling said electromagnetic valve in accordance with the operating conditions of the engine.

These objects and other objects, features and advantages of the present invention will be better understood from the following description with refence to the accompanying drawings.

DESCRIPTION OF THE PREFERRED EMBODIMENT

Figure 1:
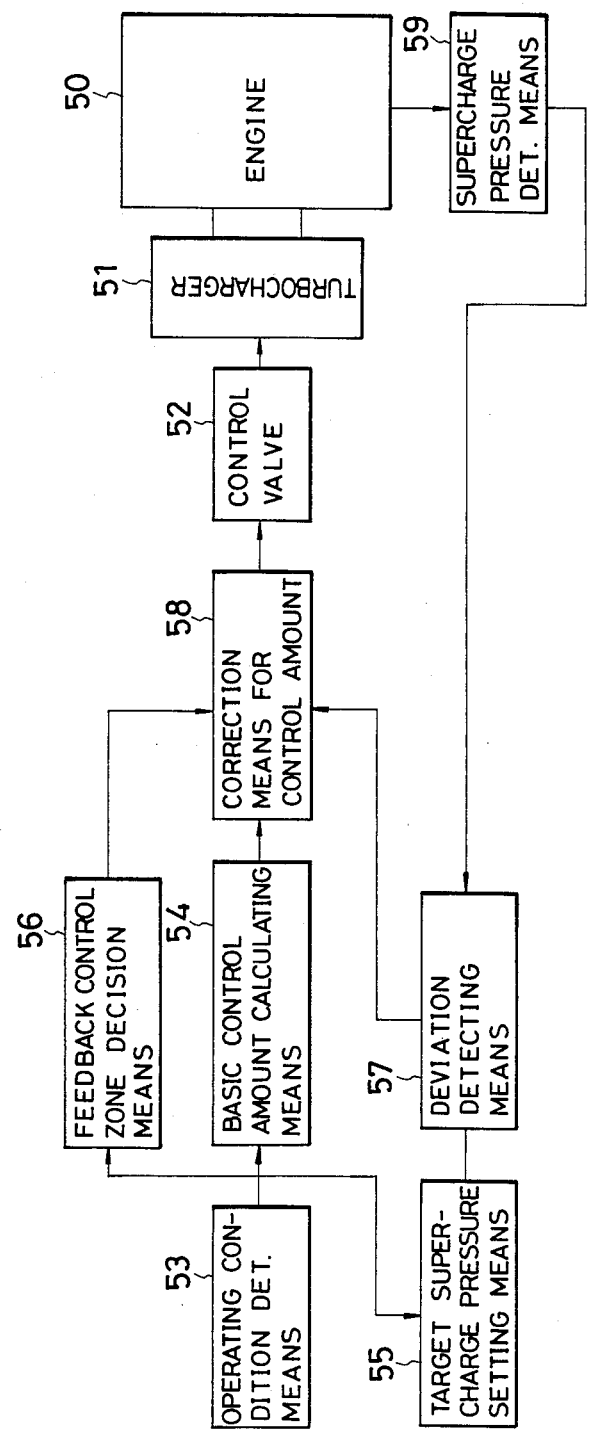
FIG. 1 is a block diagram showing a basic concept of the present invention.

FIG. 1 shows a basic concept for controlling the supercharge pressure according to the present invention.

The apparatus for controlling supercharge pressure of the invention comprises an engine 50, a turbocharger 51 which is driven by the exhaust gas energy of the engine and which supercharges intake air, the rotational speed of the turbocharger being changed by the flow speed of the exhaust gas flow and its supercharge pressure being controlled in accordance with the change in the rotational speed of the turbocharger, a control valve 52 for controlling the flow speed of the exhaust gas to an exhaust gas turbine at its inlet portion, detecting means 53 for detecting operating conditions of the engine, means 54 for calculating a basic control amount of the control valve 52 in accordance with the operating conditions detected by the detecting means, means 55 for setting up a target supercharge pressure in accordance with the operating conditions of the engine, means 56 for determining a feedback control zone of the control valve 52 in accordance with the operating conditions of the engine, means 57 for detecting the deviation between the actual supercharge pressure detected by the detecting means 59 and the target supercharge pressure, and correction means 58 for correcting the basic control amount so as to control the opening of the control valve in such a manner that the opening of the control valve is small when the actual supercharge pressure is smaller than the target supercharge pressure value, whereby the opening thereof is large when the former is higher than the latter, and it is maintained at a predetermined value when the former is equal to the latter.

According to the present invention, an optimum target supercharge pressure is set up in accordance with the operating conditions of the engine and the opening of the control valve 52 is controlled in accordance with the basic control amount calculated in accordance with the operating conditions so as to achieve agreement of the actual supercharge pressure with the target pressure value.

When a feedback control is applied to a control zone of the control valve 52, the basic control amount is corrected in accordance with the deviation between the actual supercharge pressure and the target supercharge pressure. Namely, the opening of the control valve 52 is corrected so as to reduce the opening when the actual supercharge pressure is lower than the target value, to increase the opening when the actual pressure is higher than the target value, and to maintain the opening thereof to a predetermined value when the actual pressure is equal to the target value. As a result, the actual supercharge pressure can be rapidly agreed with the target value while the actual supercharge pressure cannot be changed much by slight changes in the operating conditions of the engine, thus increasing the stability in the feedback control of the supercharge pressure.

Figure 2:
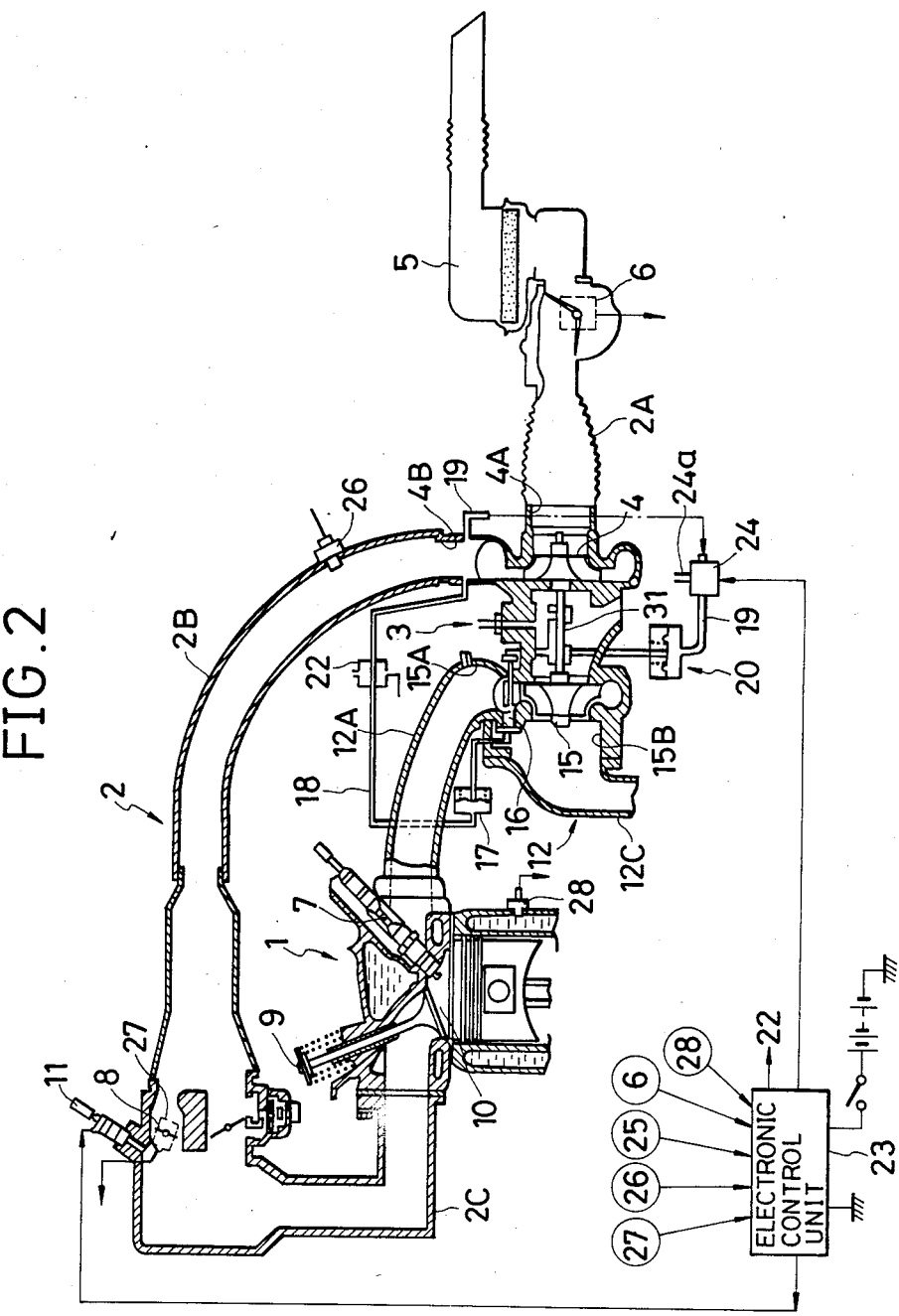
FIG. 2 is an overall engine system having a turbocharger to which the present invention has been applied.
Figure 3:
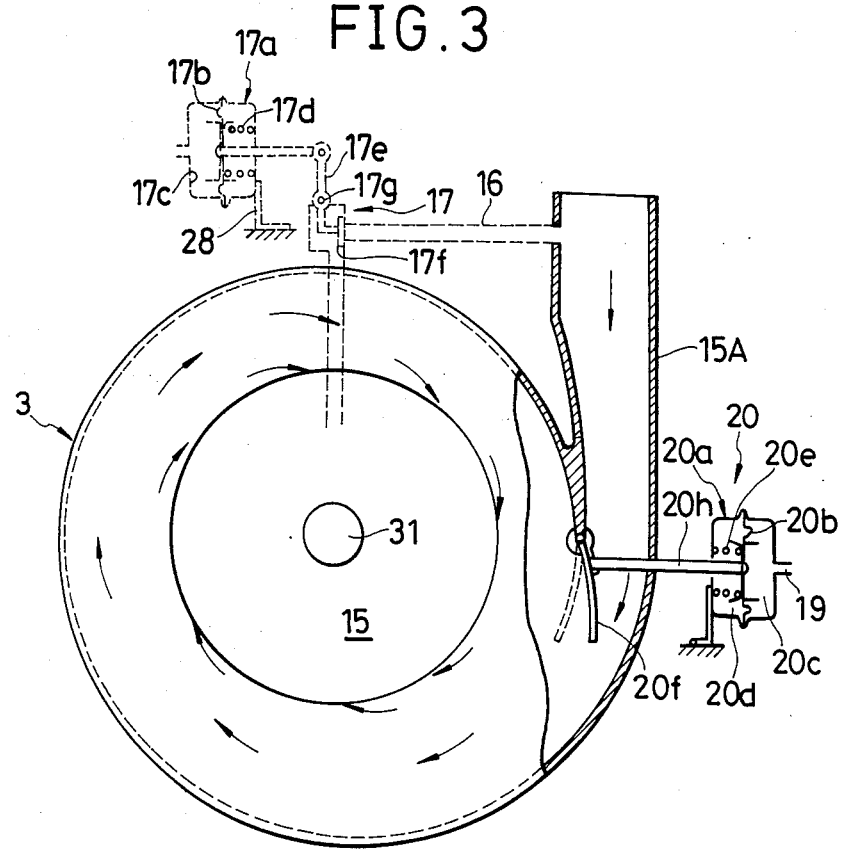
FIG. 3 is an enlarged cross-sectional view of the scroll shown in FIG. 2 of the exhaust gas turbine having a control flap valve and a control valve or an actuator.

FIGS. 2 and 3 show the contruction of an overall engine system having a turbocharger and an enlarged cross sectional view of the exhaust gas turbine. In FIG. 3, the control valve shown in FIG. 2 is also shown, the operation of which is controlled by the supercharge pressure control apparatus according to the present invention.

Reference numeral 1 indicates an engine, numeral 2 indicates an intake air path, numeral 3 indicates the turbocharger for supercharging intake air. An intake air compressor 4 and an exhaust gas turbine 15 are coupled to each other by the rotative shaft 31 of the turbocharger and the compressor 4 is driven by the rotation of the exhaust gas turbine 15.

On the upstream side, intake air path 2A connected to the inlet portion 4A of the compressor 4, there is provided an air cleaner 5 and an air flow meter 6 for measuring the intake air flow rate. On the other hand, on the downstream side intake air path 2B which is connected to the outlet portion 4B of the compressor 4, there is provided air intake manifold 2C through an inlet throttle valve 8.

An ignition plug 7 is mounted at a combustion chamber 10 of the engine and mixture from the intake manifold 2C is introduced through an inlet valve 9. The intake air passing through the throttle valve 8 is mixed with fuel injected from a fuel injection valve 11 and the mixture of a predetermined ratio of air and fuel is supplied to the engine 1.

Reference numeral 12 indicates an exhaust path having an exhaust manifold 12A to which an inlet portion 15A of the exhaust gas turbine is connected. The inlet portion 15A and the outlet portion 15B of the exhaust gas turbine 15 communicate with each other through a bypass path 16.

On the bypass path 16, there is provided an exhaust bypass valve 17 having a diaphragm unit 17a as driving means and a linkage 17e as shown in FIG. 3. The diaphragm unit 17a has a negative pressure chamber 17c separated by a diaphragm 17b and a supercharge pressure chamber 17d located upstream of the throttle valve 8 through a liaison path 18. Accordingly, when the actual supercharged pressure is increased above a predetermined supercharge pressure value, the diaphragm 17b is moved against a restoring spring 17d so that the bypass path 16 may be opened by a valve member 17f through the linkage 17e. As a result, the opening or closing of the exhaust bypass valve 17 enables it to control to maximum value of the supercharged pressure so that the predetermined value is not exceeded.

At the inlet portion 15A of the exhaust gas turbine 15, there is provided a control valve 20 for controlling the exhaust gas flow speed to the exhaust gas turbine 15. The control valve 20 comprises a diaphragm unit 20a having a diaphragm 20b, first the second chambers 20d and 20c separated by the diaphragm 20b and a spring 20e. The supercharged pressure which is a positive pressure is let into the second pressure chamber 20c from a liaison path 19 through an electromagnetic valve 24. The diaphragm 20b is coupled to a control vane or control flap valve 20f through a rod 20h. The first chamber 20d constitutes an atmospheric chamber.

Accordingly, when the positive pressure to be led into the second pressure chamber 20c is low, the diaphragm 20b is pushed by the spring 20e. As a result, the control flap valve 20f is in the position indicated by the solid line in FIG. 3, so as to increase the exhaust gas flow speed by reducing the control flap valve 20f.

In the present invention, an electronic control unit 23 is provided which controls the electromagnetic valve 24 so as to control the supercharge pressure to be supplied to the diaphragm unit 20a in accordance with the operating conditions of the engine. The electronic control unit 23 comprises a microprocessor including a central processing unit (CPU), a random access memory (RAM), a read-only memory (ROM), an A/D converter, and an input/output interface, all not shown, but well-known in the art. The detected signals from the air flow meter 6, a supercharge pressure sensor 26, an engine speed sensor 25, a throttle valve sensor 27 and a temperature sensor 28 for detecting the temperature of engine cooling water are applied to the electronic control unit 23 and they are converted into digital data corresponding to the intake flow rate Q, the engine speed CN, the throttle valve opening $\theta$, the supercharge pressure P, and the engine cooling water temperature $T_e$, etc., through the A/D converter in the control unit 23 in the well-known manner, so as to control the operation of the electromagnetic valve 24 and to obtain a predetermined supercharge pressure in accordance with the operating conditions of the engine.

The electromagnetic valve 24 for controlling the supercharge pressure is turned on and off at a predetermined frequency and it controls the positive pressure to be introduced into the second pressure chamber 20c by changing the duty ratio of the ON and OFF time period.

Figure 5:
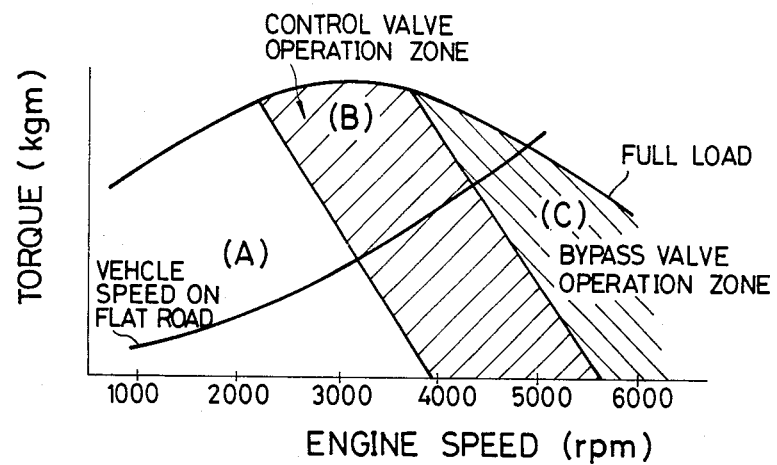
FIG. 5 is the characteristic diagram for explaining a feedback control zone and other zones between torque and engine speed to be utilized in the present invention.

As described in the foregoing, the electronic control unit 23 controls, when the area (B) is determined by determining means, when the opening of the control valve 20 is to be feedback- controlled as shown in FIG. 5, and the pressure to be applied to the second pressure chamber 20c by controlling the electromagnetic valve 24 in accordance with intake air flow rate Q (engine load), engine speed CN, and the actual supercharge pressure P detected by the sensors, so as to achieve agreement with a target value $P_s$ of supercharge pressure to be set in accordance with the operating conditions of the engine. In other words, when the actual supercharge pressure P is lowered below the predetermined value $P_s$, the exhaust gas flow is increased by reducing the opening of the control valve 20, so as to prevent the lowering of the rotational speed of the exhaust gas turbine 15, which leads to an increase in the supercharge pressure. On the other hand, when the actual supercharge pressure is increased, the exhaust gas flow is lowered by the full- opening of the control valve 20, thereby lowering the supercharge pressure as a correction.

In this case, in an operating condition of the engine where the exhaust gas flow rate is not very large and the actual supercharge pressure has still not reached the target value as shown in the area (A) in FIG. 5, the opening of the control valve 20 is maintained at a minimum opening by the electronic control unit 23, so as to allow the actual supercharge pressure to be as high as possible at the low speed zone of the vehicle. However, in a high speed, high load zone as shown by the area (C), the control valve 20 is maintained at the fully opened condition by the control unit 23.

When valve 20 is fully opened and the absolute flow rate of the exhaust gas flow is increased the rotational speed of the exhaust gas turbine 15 fails to drop and the actual supercharge pressure P would reach the upper limit value thereof. In the embodiment according to the present invention, however, any detrimental effects can be prevented, even in this case. Namely, when the actual supercharge pressure detected becomes more than, for instance, 400 mmHg, the exhaust bypass valve 17 is opened and the exhaust gas can be led downstream by bypassing the exhaust gas turbine 15. As a result, the exhaust gas energy supplied to the exhaust gas turbine 15 is decreased and this, in turn, causes the number of turbine rotations of the turbine to be lowered, thus preventing the actual supercharge pressure from being excessively large, as well as preventing damage of the engine.

Figure 4:
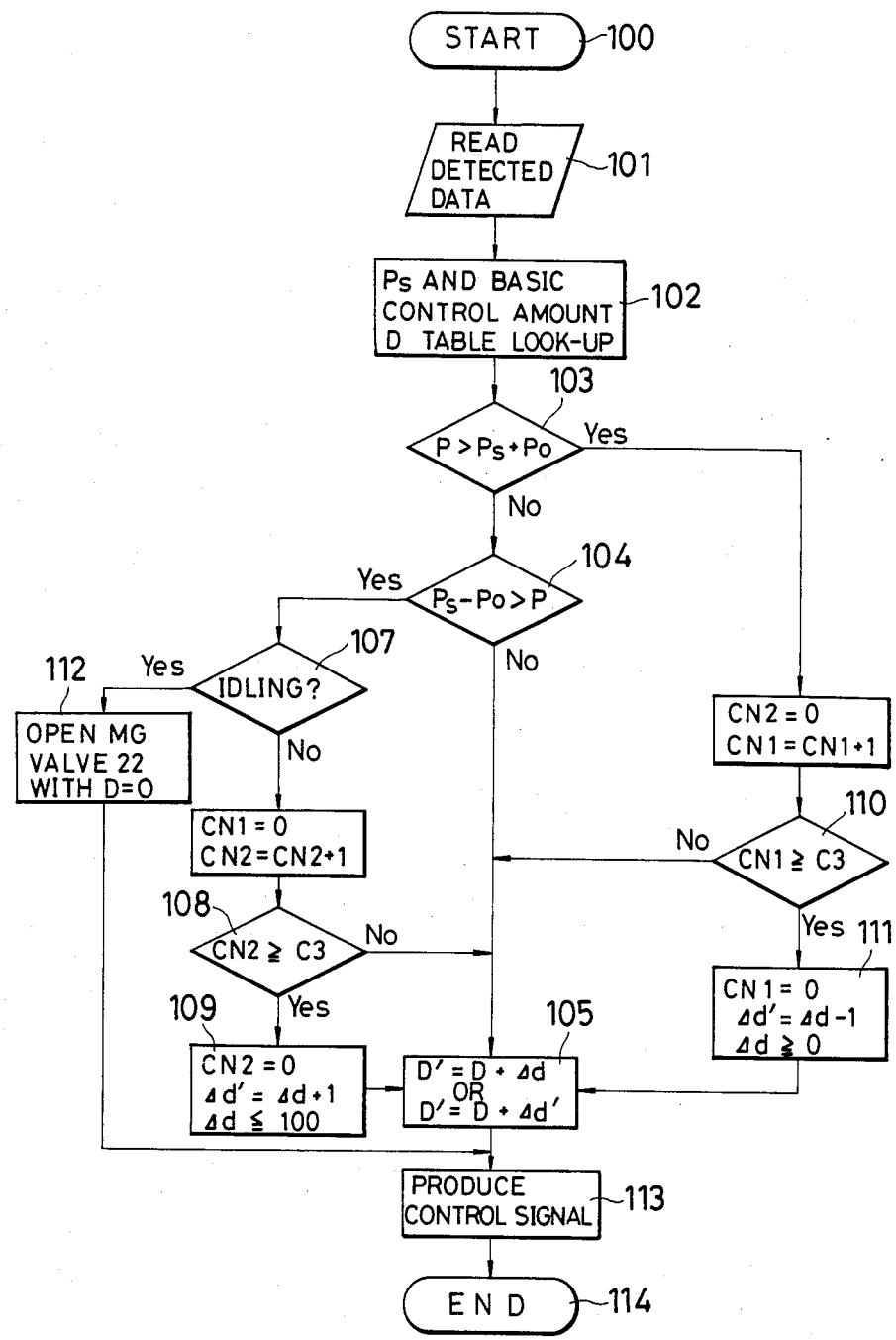
FIG. 4 is an embodiment of a control program flow chart for realizing the method of controlling supercharge pressure, according to the present invention.

FIG. 4 shows a control program flow chart for controlling the opening of the control valve 20 through the use of electromagnetic valve 24 using the electronic control unit 23 having the CPU, the ROM and the RAM.

In operation, after starting the control, the intake air flow rate Q, engine speed CN, throttle valve opening $\theta$, engine cooling water temperature Te, and the actual supercharge pressure P, which have been detected and stored in the RAM, are read from the RAM of the microprocessor in step 101 and the operation goes to step 102.

Figure 6:
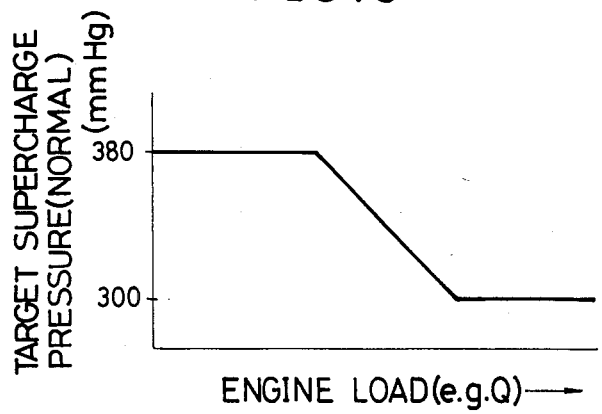
FIG. 6 is the characteristic diagram between engine load vs. target supercharge pressure for the normal running of vehicle to be used in the present invention.
Figure 8:
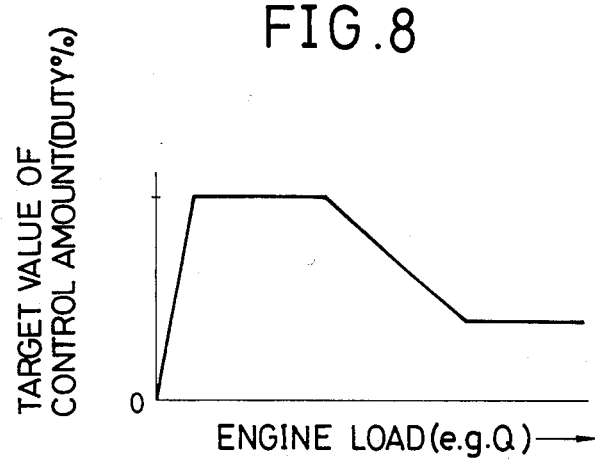
FIG. 8 is the characteristic diaphram between target value of engine load and basic control amount, to be used in the present invention.

In step 102, a target or preset supercharge pressure value $P_s$ which is suitably set up in accordance with the operating conditions of the engine as, for example, shown in FIG. 6 and a basic control amount D of the control valve 20 which is also set up, as shown in FIG. 8 in accordance with the operating conditions, are read from a look-up table in the ROM, in response to the load conditions of the engine. After this operation, the operation now goes to step 103, where a decision is made if the actual supercharge pressure P is larger than $P_s + P_o$ ($P_o$ indicates a dead zone for the predetermined supercharge pressure $P_s$, and is equal to e.g. 4 mmHg). If the result of the decision is No, the operation now moves to step 104.

In step 104, another decision is made if the actual supercharge pressure P is smaller than $P_s - P_o$. If the result of this decision is No, the operation goes to step 105, where the previous control amount $\Delta dc$ calculated at a previous time, is added to the basic control amount D so as not to perform a feedback control of the control valve 20 to realize a stability of the control. In this case, for this dead zone, even if the condition $|P-P_s|>P_o$ is established momentarily during only one revolution of the engine, its correction by the feedback control is not performed and the opening of the control valve 20 is maintained at the previous condition.

On the other hand, if the result of the decision in step 104 is YES, that is, P is smaller than $P_s-P_o$, the operation goes to step 107, where a decision is made if the vehicle speed is zero, i.e. the vehicle is in the idling condition. If the result of the decision in step 107 is NO, the operation now goes to step 108 where another decision is made if CN, which is the number of engine rotations, the engine speed or the number of engine cycles, is exceeds a predetermined value of C3 (C3=5 cycles, for instance). If the result of the decision in step 108 is NO, the operation goes to step 105, where the calculation already described is carried out.

However, if the result of the decision in step 108, is YES, the operation now goes to step 109, where the feedback correction amount is calculated by increasing the previous control amount $\Delta d$, e.g., one percent (1%). In this case, $\Delta d$ and $CN_2$ are set up as $\Delta d \leq 100$, $CN2=0$. After this calculation, the operation now goes to step 105, where the feedback correction portion $\Delta d'$ thus obtained is added to the basic control amount D and the changed basic control amount $D'$ becomes $D'=D+\Delta d'$, so as to operate the control valve 20 in the direction of closure. After this operation, the operation goes to step 113, where a control signal having the value thus calculated is produced.

Returning now to step 107, if the result of the decision in the step 107 is YES, that is, the vehicle is in the idling condition, the operation goes to step 112, where the electromagnetic valve 22 for controlling the exhaust bypass valve 17 is fully opened, with the basic control amount D being zero, i.e. D=0, thus preventing the output power from the engine from being unnecessary high.

On the other hand, if the result of the decision in step 103 is YES, that is P>$P_s$+$P_o$, the operation goes to step 110, where a decision is made if the engine speed CN1 is equal to or larger than the predetermined value of C3, or the engine speed CN1 continues above the predetermined value. If the result of the above decision is NO, the operation moves to step 105. However, if the result of the decision is YES, the operation goes to step 111, where the feedback correction portion is calculated by subtracting, for example, one percent (1%) from the control amount $\Delta d$, With $CN_1=0$ and $\Delta d>0$ and the operation goes to the step 105 after the above calculation. In step 105, the corrected amount $\Delta d'$ at this time is added to the basic control amount D, resulting in $D'=D+\Delta d'$ so as to operate the control valve 20 in the direction of opening.

In the control according to the present invention, the target supercharge pressure can suitably be set up in accordance with the operating conditions of the engine, so that a necessary output power for the engine as well as good fuel consumption characteristics can be demonstrated, without degrading the durability of the engine.

Figure 7:
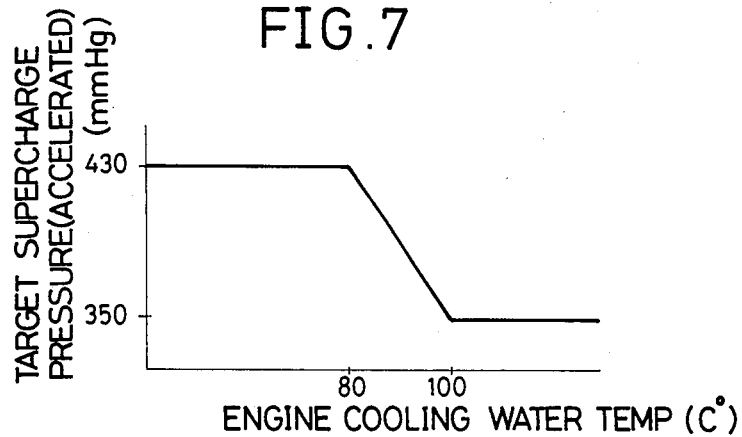
FIG. 7 is the characteristic diaphram between engine cooling water temperature and target value of supercharge pressure for an accelerated condition to be used in the present invention.

According to the present invention, the target supercharge pressure $P_s$ can suitably be set up at a higher value than the normal operation so as to obtain a preferable acceleration characteristic in the accelerated condition of the engine, as shown in FIG. 7. Since the target value of supercharge pressure is changed in accordance with the engine cooling water temperature, the target value is normally set at a lower value compared with the low temperature condition of the water, in view of extending the durability of the engine.

In a manner such as described above, when the target value of supercharge pressure is set up at a higher value in the accelerated condition, the acceleration performance of the engine can be improved by the increase in the intake air flow rate in the accelerated condition. In this case, a determination for the accelerated condition can be determined by, for instance, the calculation of the increasing rate or increment in the engine speed and, then by comparing the increment with a predetermined value.

On the other hand, when carrying out the feedback control so as to achieve agreement of the actual supercharge pressure with the target value, a basic control amount is set up preliminarily in accordance with the operating conditions of the engine and the basic control amount is corrected in accordance with the deviation between the actual supercharge pressure and the target value of supercharge pressure, according to the present invention. As a result, when the operating conditions of the engine are fluctuated, the basic control amount is also varied and in addition a correction amount for the fluctuations is added to the basic control amount thus changed, so that the opening of the control valve 20 can suitably be controlled so as to promptly achieve agreement of the actual supercharge pressure with the target value.

Furthermore, when the operating conditions of the engine are slightly varied, the feedback control is maintained constant at a predetermined value, with the result that an unstable control due to an excessive response which occurred in the apparatus according to the prior art can be avoided.

In the above case, when the operating conditions of the engine are deviated from the zone where the opening of the control valve 20 is feedback-controlled, a control signal is produced from the microprocessor and is applied to the electromagnetic valve 24 so as to minimize the opening of the control valve 20 in the area (A) in FIG. 5, while when in the area (C) in the figure, the signal is applied to the electromagnetic valve 24 so as to permit the opening of the valve to be maximum. Once the control signal is applied to the electromagnetic valve, the condition of the control valve 20 is maintained until a next control signal is applied thereto.

Accordingly, when the supercharge pressure is further increased, with the maximum opening of the control valve 20 being maintained, the exhaust bypass valve 17 is opened before reaching the upper limit of the opening, so as to suppress the number of turbine rotations or the rotational speed of the turbine, thus preventing the supercharge pressure from being excessively increased.

In the foregoing embodiment according to the present invention, the description has been made that the exhaust bypass valve 17 is directly responsive to the supercharge pressure. However, it is also possible to perform the feedback control as in the case of the control valve 20.

Moreover, in the foregoing embodiment according to the present invention, the diaphragm unit 20a is provided as a driving mechanism for the control valve 20, it is to be noted that the valve member may be controlled stepwise.

As described in the supercharge pressure control apparatus of the foregoing embodiment according to the present invention, a target value of supercharge pressure is set up in accordance with the operating conditions of the engine and a basic control amount for the control valve is also set up in advance in accordance with the operating conditions of the engine, so as to correct the basic control amount in response to the deviation between the actual supercharge pressure and the target supercharge pressure value, when performing the feedback control of the supercharge pressure. As a result, the actual supercharge pressure can accurately and yet stably be controlled to the target value required, in accordance with the operating conditions of the engine, without deteriorating the durability of the engine. This also leads to the improvement in the fuel consumption rate.

Moreover, since the actual supercharge pressure can promptly be controlled to the target value, the supercharge pressure can rapidly be lowered even when shifting from a high supercharged pressure condition to a low supercharged pressure condition, thus securely preventing the knocking phenomena of the engine from occurring.

Since the opening of the control valve 20 is maintained constant in zones out of the feedback control zone after determining the feedback control zone of the control valve, the control interference from the exhaust bypass valve which is opened when the actual supercharge pressure approaches the upper limit of the pressure, can be avoided, thus sufficiently enabling the distinctive performance of the control valve and the exhaust bypass valve required, to be sufficiently demonstrated.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A method of controlling supercharge pressure for a turbocharger, which comprises the steps of:
    (a) detecting a plurality of engine parameters including actual engine speed CN, intake air flow rate Q, and actual supercharge pressure P;
    (b) reading a basic control amount D and a target supercharge pressure $P_s$ from a look-up table in accordance with said detected engine parameters;
    (c) comparing the actual supercharge pressure P, in a first comparison, with a predetermined first target value $(P_s + P_o)$ of supercharge pressure, wherein $P_o$ indicates a dead zone and $P_s$ indicates a predetermined supercharge pressure;
    (d) comparing the actual supercharge pressure P, in a second comparison, with a predetermined second target value $(P_s - P_o)$ of the supercharge pressure in accordance with the result of the first comparison;
    (e) maintaining the same control condition as that performed at a previous time by adding a previous control amount vd to the basic control amount D if the results of said first and second comparisons satisfy a certain condition $(P_s - P_o / P / P_s + P_o)$; and
    (f) calculating a feedback correction amount vd' by subtracting a predetermined value a from the previous control amount vd if the result of the first comparison is that the actual supercharge pressure is greater than the predetermined first target pressure or by adding a predetermined value a to the previous control amount vd if the result of the first comparison is that the actual supercharge pressure is not greater then the predetermined first target value and the result of the second comparison is that the actual supercharge pressure is less than the predetermined second target pressure and controlling the opening of a control valve which controls exhaust gas flow to said turbocharger in accordance with the value of vd' either in the direction of opening or in the direction of closure of the control valve to adjust the flow of exhaust gas to said turbocharger.

2. The method of controlling supercharge pressure for a turbocharger as claimed in claim 1 wherein said first and second target value includes a first dead zone $(+P_o)$ and a second dead zone $(-P_o)$, respectively.

3. The method of controlling supercharge pressure for a turbocharger as claimed in claim 1 wherein said predetermined value $a$ is equal to plus or minus a value to the previous control amount $\Delta d$, and the changed basic control amount $D'$ is $D' = D + \Delta d'$.

4. The method of controlling supercharge pressure for a turbocharger as claimed in claim 1 wherein the method further comprises the step of determining if the vehicle's speed is zero or the vehicle is in the idling condition.

5. The method of controlling supercharge pressure for a turbocharger as claimed in claim 4 wherein when the result of the determination is YES, i.e., the vehicle is in the idling condition, an exhaust bypass valve is opened, with the basic control amount $D = 0$.

6. The method of controlling supercharge pressure for a turbocharger as claimed in claim 1 wherein the first and second target values are set up at a higher value in an accelerated condition than that in the normal running condition and they are varied in accordance with changes in the engine cooling water temperature, respectively.

7. The method of controlling supercharge pressure for a turbocharger as claimed in claim 2 wherein the first $(+P_o)$ and second $(-P_o)$ dead zones are $\pm 5$ mmHg, respectively.

8. An apparatus for controlling supercharge pressure for a turbocharger, which comprises:
    (a) a plurality of detecting means for detecting a plurality of operating conditions of the engine, including intake air flow rate, supercharge pressure, and engine speed;
    (b) a control flap valve provided at an inlet of an exhaust gas turbine of said turbocharger for controlling the flow speed of the exhaust gas flowing into the exhaust gas turbine and having a shaft member;
    (c) an actuator coupled to said shaft member of said control flap valve through arm and rod means for effecting said coupling;
    (d) an electromagnetic valve provided for controlling said actuator in accordance with a control signal;
    (e) an electronic control unit having a microprocessor including a CPU, a RAM, and a ROM for producing said control signal and for controlling said electromagnetic valve in accordance with the operating conditions of the engine;

(f) an exhaust bypass valve provided at an exhaust manifold and having linkage means coupled to a second actuator; and (g) a second electromagnetic valve provided for controlling said exhaust bypass valve through said second actuator in accordance with a second control signal from said electronic control unit.

9. An apparatus for controlling supercharge pressure of a turbocharger, said apparatus comprising:

first detecting means for detecting operating conditions of an engine;

second detecting means for detecting the actual supercharge pressure of said turbocharger;

control valve means disposed in an inlet portion of an exhaust turbine and having a variable size aperture for controlling flow velocity of exhaust gas to the turbocharger;

first calculating means for calculating a basic control amount for the control valve means in accordance with the detected operating conditions;

means for setting a target supercharge pressure in accordance with the detected operating conditions;

second calculating means for calculating a deviation between the target supercharge pressure and the actual supercharge pressure;

means for judging a feedback control region of the control valve means in accordance with the detected operating conditions; and control means for correcting the basic control amount in accordance with the deviation calculated by the second calculating means and the feedback control region of the control valve means judged by the judging means such that the aperture of the control valve means is small when the actual supercharge pressure is lower than the target supercharge pressure, and the aperture of the control valve means is large when the actual supercharge pressure is higher than the target supercharge pressure, and the aperture of the control valve means is maintained at a predetermined value when the actual supercharge pressure is equal to the target supercharge pressure.

10. An apparatus as claimed in claim 9, wherein said control valve means includes a flap valve.

11. An apparatus as claimed in claim 9, wherein said control valve means includes a bypass valve.

12. An apparatus for controlling supercharge pressure of a turbocharger, said apparatus comprising:

means for detecting the actual supercharge pressure;

control valve means disposed in an inlet portion of an exhaust turbine of said turbocharger and having a variable size aperture for controlling the flow velocity of the exhaust gas toward the turbine;

means for setting a basic control amount for the control valve means in advance;

means for setting a target supercharge pressure;

calculating means for calculating a deviation between the target supercharge pressure and the actual supercharge pressure; and control means for correcting the basic control amount in accordance with the deviation calculated by the calculating means such that the aperture of the control valve means is small when the actual supercharge pressure is lower than the target supercharge pressure, and the aperture of the control valve means is large when the actual supercharge pressure is higher than the target supercharge pressure, and the aperture of the control valve means is maintained at a predetermined level when the actual supercharge pressure is equal to the target supercharge pressure.

* * * * *